United States Patent [19]
Core et al.

[11] Patent Number: 5,392,332
[45] Date of Patent: Feb. 21, 1995

[54] SHARED LINE TELEPHONE ANSWERING SYSTEM WITH A TELEPHONE LINE-POWERED DISCONNECT MODULE

[75] Inventors: Kenneth R. Core, Stanton; Mark J. Karnowski, Garden Grove; Stephen B. Knuth, Mission Viejo, all of Calif.

[73] Assignee: PhoneMate, Inc., Torrance, Calif.

[21] Appl. No.: 890,562

[22] Filed: May 27, 1992

[51] Int. Cl.6 .................. H04M 1/64; H04M 1/72
[52] U.S. Cl. .................................. 379/67; 379/77; 379/100; 379/195
[58] Field of Search .................. 379/67, 88, 100, 160, 379/161, 184, 195, 194, 77

[56] References Cited

U.S. PATENT DOCUMENTS

| | | | |
|---|---|---|---|
| 3,033,932 | 5/1962 | Lomax | 379/184 |
| 4,001,508 | 1/1977 | Johnson | 379/69 |
| 4,444,999 | 4/1984 | Sparrevohn | 379/195 |
| 4,451,707 | 5/1984 | Hanscom | 379/373 |
| 4,625,079 | 11/1986 | Castro | 379/77 |
| 4,653,089 | 3/1987 | Eydelman | 379/ |
| 4,703,499 | 10/1987 | Fossas et al. | 379/194 |
| 4,737,979 | 4/1988 | Hashimoto | 379/82 |
| 4,741,024 | 4/1988 | Del Monte | 379/181 |
| 4,782,518 | 11/1988 | Mattley et al. | 379/201 |
| 4,788,714 | 11/1988 | Hashimoto | 379/74 |
| 4,805,210 | 2/1989 | Griffith, Jr. | 379/195 |
| 4,891,834 | 1/1990 | Sezaki et al. | 379/67 |
| 4,893,334 | 1/1990 | Parnello | 379/157 |
| 4,916,732 | 4/1990 | Kotani et al. | 379/100 |
| 4,922,526 | 5/1990 | Morganstein et al. | 379/157 |
| 4,926,461 | 5/1990 | Kuok | 379/67 |
| 4,941,166 | 7/1990 | Waldman et al. | 379/67 |
| 4,958,370 | 9/1990 | Shimamuki | 379/157 |
| 4,998,273 | 3/1991 | Nichols | 379/102 |
| 5,056,132 | 10/1991 | Coleman et al. | 379/95 |
| 5,086,458 | 2/1992 | Bowen | 379/180 |
| 5,119,418 | 6/1992 | Dupillier | 379/373 |
| 5,125,026 | 6/1992 | Holcombe | 379/167 |
| 5,339,354 | 8/1994 | Becker et al. | 379/67 |

OTHER PUBLICATIONS

Brochure entitled "Only one phone line?", published by PhoneMate, Inc. of Torrance, Calif., Aug., 1991.
Brochure entitled "PAM Private Answering Machine", published by PhoneMate, Inc. of Torrance, Calif., May, 1991.
Brochure entitled "PAM-2 Private Answering Machine with Feature Phone", published by PhoneMate, Inc. of Torrance, Calif., Dec., 1991.

*Primary Examiner*—Thomas W. Brown
*Attorney, Agent, or Firm*—Frishauf, Holtz, Goodman & Woodward

[57] ABSTRACT

A disconnect module for a system of telephone answering devices (TADs) sharing the same telephone line. The disconnect module is connected between the telephone line and a main telephone answering device (MTAD) which initially responds to incoming telephone calls by answering the incoming call. Extension telephone answering devices (ETADs) are selectively activated by caller-initiated DTMF tone codes. When one of the ETADs is activated, the disconnect module breaks the connection between the MTAD and the telephone line. The disconnect module maintains the broken connection until the ETAD finishes its call-answering cycle, or until the caller hangs up. When the MTAD can no longer interfere with the ETAD's reception of the call, the connection between the telephone line and the MTAD may be re-established so that the MTAD can answer the next incoming telephone call. The disconnect module is powered by the telephone line or may be incorporated into the MTAD.

14 Claims, 3 Drawing Sheets

DISCONNECT BOX BLOCK DIAGRAM

SHARED LINE TELEPHONE ANSWERING SYSTEM WITH A TELEPHONE LINE-POWERED DISCONNECT MODULE

BACKGROUND OF THE INVENTION

1. Field of the Invention

This invention relates to telephone answering devices, and more particularly to a module for disconnecting an established telephone connection between a telephone line and a telephone answering device in response to user-transmitted DTMF tone codes.

2. Description of the Related Art including information disclosed under 37 C.F.R. §1.97-1.99

Recent developments in telephone answering devices now allow several telephone answering devices (TADs) to share the same telephone line. Each TAD operates independently of all the others. In order to coordinate the activities of all the TADs, only one TAD answers the incoming telephone call while the others remain passive until activated by a code entered by the caller. The answering TAD is designated as the main or master TAD (MTAD). The passive TADs are designated as extension TADs or ETADs.

When the MTAD answers the incoming telephone call, the caller is informed by an outgoing voice message that entry of a tone code from the dual-tone multi-frequency (DTMF) keypad present at the caller's telephone will activate one of the passive ETADs. As each ETAD has its own unique tone code, the caller can activate one of possibly several ETADs sharing the same telephone line.

While the caller can uniquely activate one of several ETADs in order to preserve the privacy of any telephone message that might be left by the caller, the MTAD must be disconnected or otherwise rendered inactive so that it does not also record the caller's message. Previously, the MTAD was disconnected from the telephone call by a disconnect module that temporarily broke the connection between the MTAD and the telephone line. Such a disconnect module was powered in the usual manner, namely by a connection to a wall socket or by a battery. However, requiring outside power for the disconnect module could prevent the use of an MTAD/ETAD system, or make such use inconvenient. If batteries were used, periodic replacement of the batteries is required.

SUMMARY OF THE INVENTION

A telephone-line powered disconnect module for use in MTAD/ETAD systems is disclosed. The disconnect module is connected between the MTAD and the telephone line. When the MTAD answers the incoming telephone call, the disconnect module detects the current flowing between the telephone line and the MTAD. As a result, the disconnect module allows unregulated DC power derived from the telephone line to flow to a voltage regulator. The voltage regulator supplies the disconnect module with a supply of regulated DC power.

The connection between the telephone line and the MTAD is maintained until an ETAD sharing the same telephone line is activated. When activated, the ETAD will cause the telephone line to suffer a voltage drop or the ETAD can be constructed so as to emit a seizure signal/carrier tone beyond the normal audio band of the telephone line. Either the seizure signal or the voltage drop can act as an indicator to the disconnect module, prompting it to temporarily disconnect the MTAD from the telephone line while the ETAD has seized a connection. After the MTAD resets, the connection between the telephone line and the MTAD is reestablished so that the MTAD can answer the next call.

OBJECTS OF THE INVENTION

It is an object of this invention to provide a disconnect module for a system of telephone answering devices (TADs) sharing the same telephone line.

It is an object of this invention to provide such a disconnect module that does not require an outside source of power such as batteries or a connection to a wall socket.

It is an object of this invention to provide such a disconnect module that is powered from the telephone line.

It is an object of this invention to provide disconnection circuitry for a main telephone answering device (MTAD).

It is an object of this invention to provide a disconnect module for a system of TADs sharing the same telephone line where there is one MTAD and at least one extension telephone answering device (ETAD).

These and other objects and advantages of the present invention will be apparent from a review of the following specification and accompanying drawings.

DESCRIPTION OF THE PREFERRED EMBODIMENTS

Figure 1:
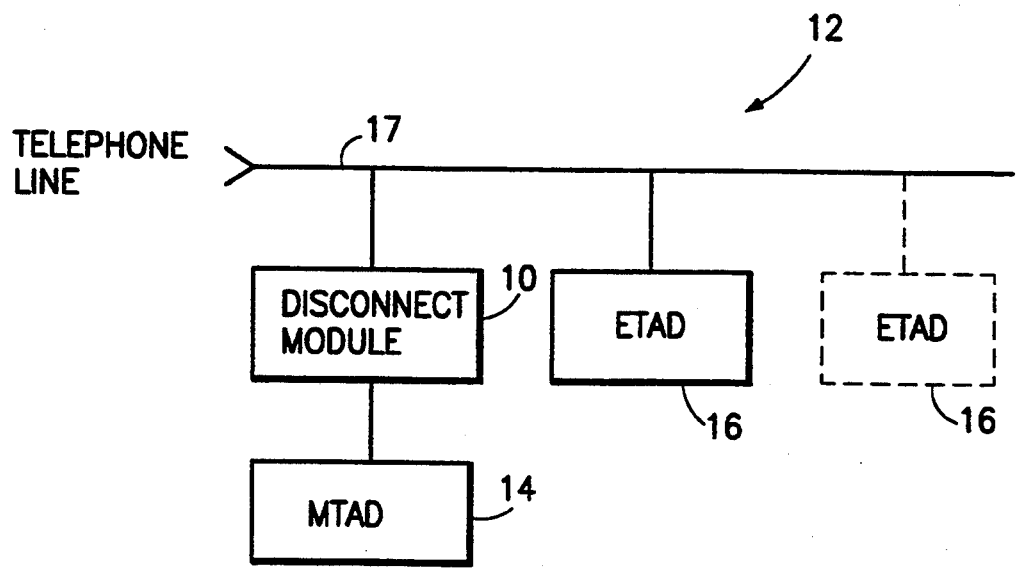
FIG. 1 is a schematic view of the MTAD/ETAD system of the present invention.

As shown in FIG. 1, the line powered disconnect module 10 forms a part of a telephone answering system 12 connected to both the telephone utility and a typical telephone. The telephone answering system has a main telephone answering device (MTAD) 14 and as well as extension telephone answering devices (ETADs) 16.

When an incoming call is answered by the MTAD 14, a connection is completed by the MTAD 14 to the telephone line 17. This connection is made through and can be affected by the disconnect module 10. When a call connection is established, power is present upon the telephone line 17 that can be used for the purposes of the disconnect module 10.

The disconnect module 10 of the present invention is serially connected between the telephone utility lines 17 and the MTAD 14. The disconnect module 10 serves to take the MTAD 14 off line once an ETAD 16 has seized the line and begun to answer the telephone call. In this way, the disconnect module 10 controls the operation of the MTAD 14 for the benefit of the ETADs 16 that are also connected to the telephone line.

Figure 2:
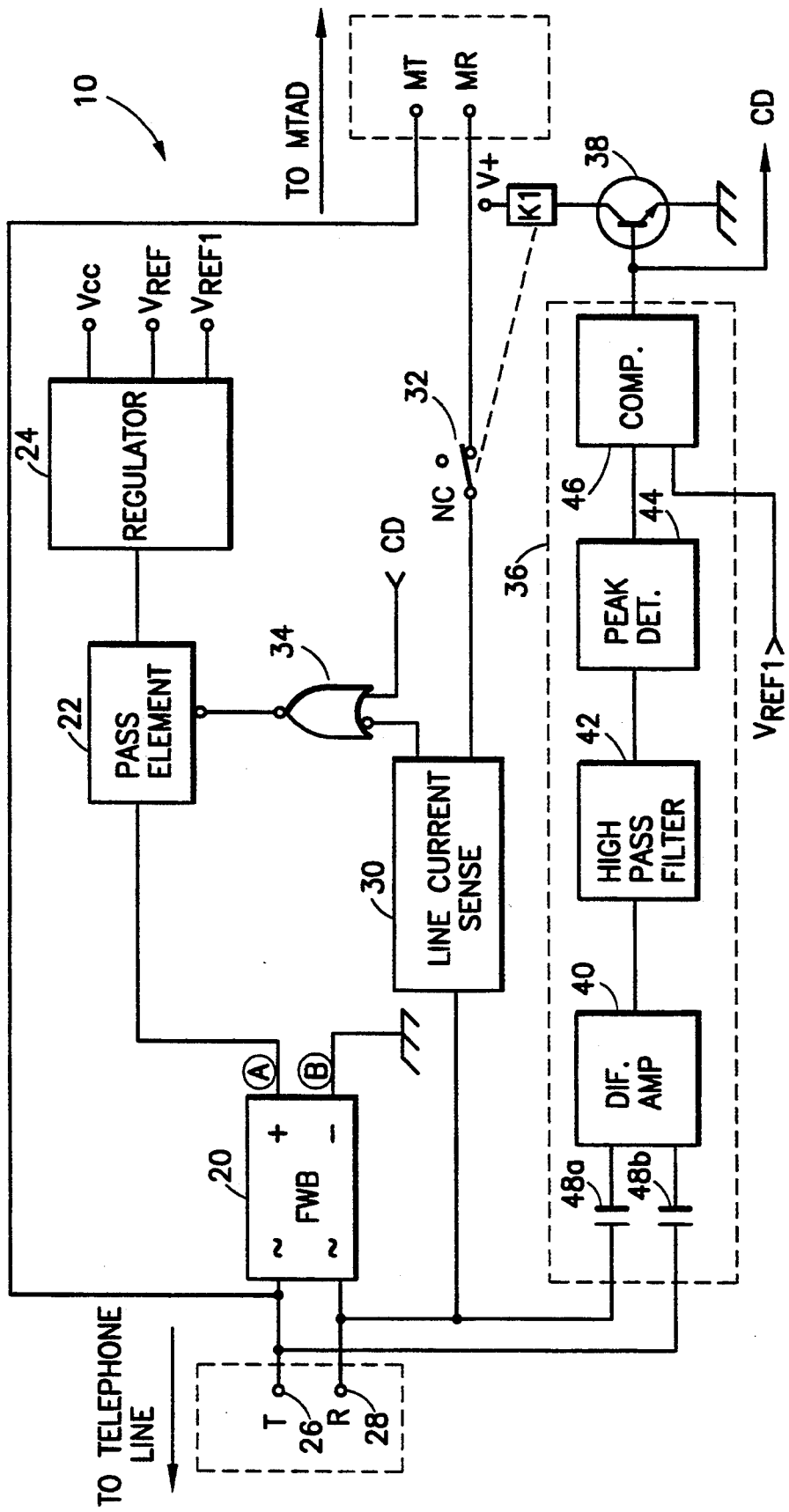
FIG. 2 is a schematic view of a disconnect module of the present invention.

As shown in FIG. 2, the telephone line powered disconnect module 10 has internal circuitry establishing and controlling the connection between the telephone line 17 and the MTAD 14. A full wave bridge rectifier 20 provides a positive potential at point A with respect to reference point B. The output of the bridge 20 at point A is connected to a pass element 22 that serves as a power switch for the disconnect module 10.

The pass element 22 is in turn connected to a voltage regulator 24. The regulator 24 supplies the disconnect module 10 with three sources of voltage: $V_{cc}$, $V_{REF}$, and $V_{REF1}$.

The MTAD 14 is connected directly to the tip line 26 of the telephone line 17 through the disconnect module 10. The ring line of the MTAD 14 is connected to the ring line 28 of the telephone line 17 through a line current sense circuit 30 and a relay 32 within the disconnect module 10.

The line current sense circuit 30 has its output connected to on input of OR gate 34. The second input to OR gate 34 is connected to the output of ETAD seizure detect circuit 36, the output identified as CD. The output of the OR gate 34 is connected to the pass element 22 and controls the response of the pass element 22 when the MTAD 14 answers a call or when an ETAD seizure is detected.

When a caller desires to activate or use an ETAD 16, a DTMF tone code sequence is transmitted ]by the caller through the telephone line 17 and onto the MTAD 14 and all connected ETADs 16. In the preferred embodiment, when a connected ETAD 16 detects the DTMF tone code sequence assigned to it, the ETAD 16 seizes the line and emits a super-audible carrier tone that is transmitted over the telephone line 17. The carrier tone acts as a seizure signal that indicates that an ETAD 16 has seized the line. The seizure signal can be detected electronically, but is preferably outside the frequency range of the telephone line audio band as is, for example, a super-audible carrier tone. Such a seizure signal can not be heard by those who use the telephone. Alternatively, any signal that does not interfere with normal telephone conversation can be used by the ETAD 16 to activate the disconnect module 10.

In order to detect the seizure signal from the ETAD 16, an ETAD seizure detect circuit 36 is present inside the disconnect module 10 and is connected to telephone line 17, $V_{REF1}$, the OR gate 34, and a transistor 38. When the ETAD seizure detect circuit 36 detects the ETAD seizure signal, the ETAD seizure detect circuit 36 produces an output signal that serves to disconnect the MTAD 14 from the telephone line 17.

The ETAD seizure detect circuit 36 is connected to both the tip 26 and ring 28 lines of the telephone line 17. A differential amplifier 40 takes as input the signals from the tip 26 and ring 28 lines and transmits its output to a high pass filter 42. The high pass filter transmits its output to a peak detector 44, which in turn transmits its output to a comparator 46. The output from the comparator 46 is connected to a transistor 38 that controls a relay 32. Coupled with the transistor 38, the relay 32 forms a switch that disconnects the MTAD 14 from the telephone line 17 so that the ETAD 16 has exclusive telephone line access.

When an incoming telephone call activates the MTAD 14, a message may be played by the MTAD 14 indicating that options are available to the caller in order to activate a connected ETAD 16. If the caller chooses not to exercise one of these options, the default operation of the MTAD 14 proceeds as it normally would as if there were no ETADs 16 or a disconnect module 10 present. If the caller chooses to activate one of the ETADs 16, a DTMF tone code sequence is transmitted through the telephone line 17 using the caller's telephone keypad. Upon detection of the appropriate DTMF tone code, the ETAD 16 seizes the telephone line jointly with the MTAD 14 in order to ultimately take over the telephone call.

The ETAD 16 then transmits a seizure signal indicating to the disconnect module that an ETAD 16 has seized a connection with the telephone line. The seizure signal cannot be heard by the human ear and does not interfere with the normal operation of the telephone, but is electronically detectable by the disconnect module 10. The seizure signal is detected by the ETAD seizure detect circuit 36 in the disconnect module 10. Upon detecting the seizure signal from the ETAD 16, the disconnect module 10 activates the relay 32 to disconnect the MTAD 14 from the telephone line 17. The MTAD 14 remains disconnected for the duration of call and proceeds to operate as though it were connected to the telephone line 17 after a caller had hung up. The MTAD 14 then resets itself to await another incoming telephone call.

The ETAD 16 continues to emit the seizure signal for the duration it is connected to the telephone line 17 and ceases emitting the seizure signal after it detects that the caller has hung up, either before or after leaving a message.

As the disconnect module 10 of the present invention is powered entirely by the telephone line 17, no external power supply is needed, avoiding additional circuitry that can be cumbersome, bulky and inconvenient to use and/or provide.

The full-wave bridge rectifier 20 is connected at its inputs to both the tip 26 and ring 28 lines of the telephone line 17. The full-wave bridge rectifier 20 supplies unregulated DC power to the disconnect module 10. The negative output B of the full-wave bridge rectifier 20 is connected to common. The positive output A of the rectifier 20 is connected to the pass element 22 and leads ultimately onto the voltage regulator 24.

The MTAD 14 is directly connected to the tip line 26 of the telephone line 17, but is connected to the ring line 28 through the line current sense circuit 30 and the relay 32. When a call is answered by the MTAD 14, and a complete circuit is made with the telephone line 17, the line current sense circuit 30 detects the completed connection made by the MTAD 14 with the telephone line 17 due to the presence of current flow on the ring line 28. When the line current sense circuit 30 detects the appropriate current flow on the ring line 28, the line current sense circuit 30 transmits a low signal to the OR gate 34 indicating the completion of the call circuit by the MTAD 14.

The low indicating signal of the line current sense circuit 30 is inverted at the OR gate 34 so that a high signal is impressed upon the input of OR gate 34. When either or both inputs to the OR gate 34 are active, the OR gate 34 emits a high signal for transmission to the pass element 22.

When either or both the line current sense or carrier detect (CD) inputs to the OR gate 34 are active, the OR gate 34 goes high and allows the voltage present at the input to the pass element 22 to be transmitted through the pass element 22. The voltage passing through the pass element 22 is transmitted to a voltage regulator 24 which regulates the voltage supplied from the pass element 22 so that other components of the disconnect module 10 have a regulated source of DC power.

It can be seen that when the MTAD 14 answers an incoming call, regulated power is supplied to the disconnect module 10. So long as the MTAD 14 is connected to the telephone line (through the disconnect module 10) and no ETAD 16 has been activated, the disconnect module 10 remains in this initial power-up state. However, the ability to activate an ETAD 16 is one significant advantage to the present invention. When the caller transmits the tone code for an ETAD 16, the ETAD 16 seizes the line 17 and emits a seizure signal for the duration of its connection with the telephone line 17.

When the seizure signal is emitted by the ETAD 16, it is not heard by the caller nor detected by the MTAD 14 and so does not interfere with normal telephone operations. The disconnect module 10 does detect the seizure signal with its ETAD seizure detect circuit 36 and begins the process to disconnect the MTAD 14 from the telephone line 17 for the remaining duration of the call.

When the seizure signal is emitted by the ETAD 16, the filtering capacitors 48a, 48b allow the seizure and other alternating signals to pass through them while preventing further transmission of any DC signals. The seizure signal, as well as other oscillating signals, are transmitted from the tip 26 and ring 28 lines to the inputs of the differential amplifier 40. The differential amplifier 40 amplifies the higher frequency signals coming from the telephone line 17 (including the seizure signal of an ETAD 16) while attenuating the lower frequency voice band signals coming from the tip 26 and ring 28 lines.

The differential amplifier output is fed to the high pass filter 42 which eliminates the low frequency signals from its input signal. The high pass filter 42 further attenuates the undesired lower frequency signals while maintaining the signal strength of the higher frequency signals. The high pass filter 42 feeds this output to the peak detector 44.

The peak detector 44 monitors its input for signals at or above a certain level. When such signals are detected by the peak detector 44, the peak detector 44 sends as output a DC signal proportional to the AC signal taken as input by the peak detector 44. The output from the peak detector 44 acts as one of the two input signals for the comparator 46.

The other input signal for the comparator 46 is the $V_{REF1}$ signal of the voltage regulator 24. The comparator 46 receives as input the DC signals from the peak detector 44 and the $V_{REF1}$ output of the voltage regulator 24 and compares the two signals. If the signal from the peak detector 44 is sufficiently greater than the $V_{REF1}$ signal, a seizure signal is detected as present on the telephone line 17 and the comparator 46 emits a high signal as output to the base of transistor 38 and to the CD input of the OR gate 34. If the peak detector signal is less than the $V_{REF1}$ signal, no seizure signal is detected as present on the telephone line 17 and a low signal is emitted as output by the comparator 46.

In order to disconnect the MTAD 14 from the telephone line 17, when the comparator 46 senses that the signal from the peak detector 44 is sufficiently greater than the signal from the $V_{REF1}$ output of the voltage regulator 24, the comparator 46 sends a high signal as output to the transistor 38 base and the CD input of the OR gate 34. When the comparator 46 sends its high signal to the transistor 38 base and the OR gate 34, the relay 32 opens and power is maintained to the disconnect module circuitry through the OR gate 34 and the pass element 22. The open relay 32 disconnects the MTAD 14 from the telephone line 17 and remains disconnected until the ETAD 16 disconnects from the telephone line 17 and ceases to emit its signal.

The relay 32 is normally closed so that a connection is established and maintained between the MTAD 14 and the telephone line 17. The relay 32 is the primary, active component within the disconnect module 10 and is initially supplied with power from the voltage regulator 24 when the connection to the telephone line 17 is first established by the MTAD 14. When the ETAD seizure signal is detected and the comparator output goes high, the power to the relay 32 is maintained by the transmission of the high comparator output signal to the OR gate 34. Before the MTAD 14 is disconnected by the relay 32, both inputs to the OR gate 34 from the line current sense 30 and the comparator 46 circuits are active and the OR gate 34 transmits a high output signal to activate the pass element 22.

When the comparator output signal is high, the base of the transistor 38 connected to the comparator 46 also goes high. The transistor 38 allows current to flow through it to ground when the base is high but allows no current flow when the base is low. When the base is high and current flows through the transistor 38, the relay 32 connected to the collector of the transistor 38 becomes part of a completed circuit (from $V_{cc}$ of the voltage regulator 24 to ground) and becomes active. When the relay 32 is active, it opens and disconnects the MTAD 14 from the ring line 28 of telephone line 17 to temporarily disconnect the MTAD 14 from the telephone line 17.

When the MTAD 14 is disconnected from the telephone line 17 by the relay 32, the output from the line current sense circuit 30 goes low as it no longer experiences a closed circuit. However, even though the line current sense output is low, the pass element 22 is maintained in its conductive and power transmitting state by the output from the comparator 46 which remains high while the ETAD 16 emits its seizure signal. The relay 32 remains open as the ETAD seizure signal controls the comparator 46, OR gate 34 and pass element 22 so that the relay 32 remains supplied with power although the line current sense circuit 30 has gone low.

When the ETAD 16 ceases to emit its seizure signal (such as when the caller hangs up and the connection is broken), the comparator 46 output drops. When the comparator output drops, the transistor 38 switches off and turns off the relay 32 to disable the pass element 22. The normally-closed relay 32 closes again and the MTAD 14 is then again connected to the telephone line 17 so that it can answer the next call.

In an alternative embodiment, the ETAD seizure detect circuitry could use other circuit configurations than the one previously described. For example, the drop in DC line voltage that occurs when an ETAD 16 seizes the line could be detected by and used to activate the disconnect module 10. For this, a self-biasing comparator such as the one described in U.S. Pat. No. 4,451,707 issued on May 29, 1984 to Hanscom (incorporated herein by reference) could be used in a circuit configuration as shown in FIG. 3.

The self-biasing comparator generates only a short pulse. Due to the transitory nature of the output of the self-biasing comparator, a one-shot (monostable multivibrator) may be used to lengthen the short pulse of the self-biasing comparator to a minute or more. The output from the one-shot becomes the input to both the base of the transistor which controls the relay and the OR gate as the CD (carrier detect). This ensures that the MTAD 14 is disabled long enough for the MTAD 14 to complete its cycle and drop its connection to the telephone line 17.

Figure 3:
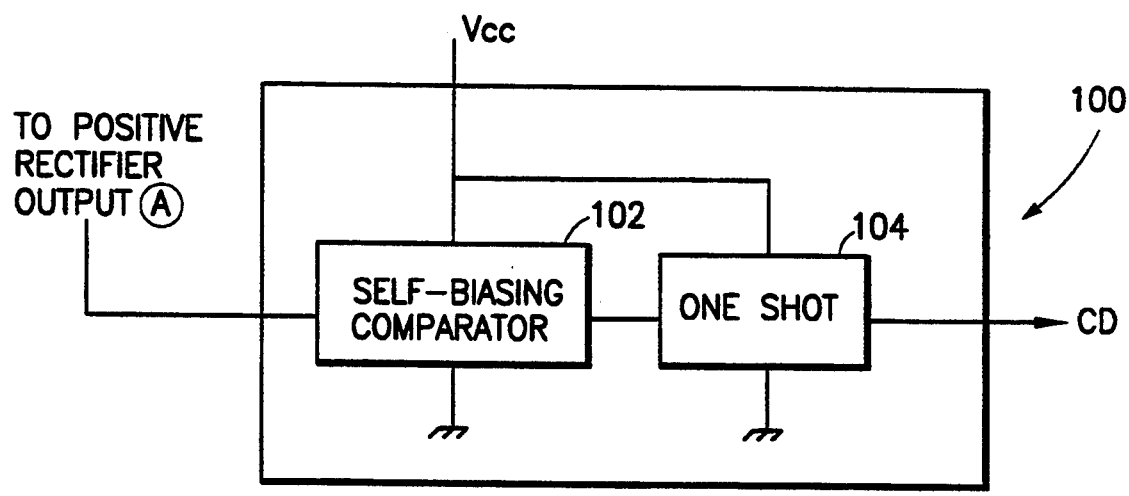
FIG. 3 is a schematic view of an alternative ETAD line seizure detect circuit.

As shown in FIG. 3, the alternative ETAD seizure detect circuit 100 has a self-biasing comparator 102 connected to a one-shot 104. The self-biasing comparator 102 and the one-shot 104 are both connected to $V_{cc}$ and ground. The self-biasing comparator 102 is connected to and receives as input a signal from the positive output A of the full-wave bridge rectifier 20. The output from the self-biasing comparator 102 is taken as input by the one-shot 104. The output from the one-shot 104 is taken as input by the transistor 38 base and the OR gate 38 (just as for the comparator 46 in the first embodiment).

When the one-shot output is active, the transistor 38 conducts and the relay 32 opens to disconnect the MTAD 14 from the telephone line 17. Also, the CD input to the OR gate 34 becomes active to maintain power to the relay 32. During the time the output of the one-shot 104 is high, the MTAD 14 resets to await another incoming telephone call. After the one-shot 104 has run its course, its output goes low to allow the relay 32 to close. When the MTAD 14 is cut off from the telephone line 17, the ETAD 16 is able to operate without interference from the MTAD 14.

Figure 4:
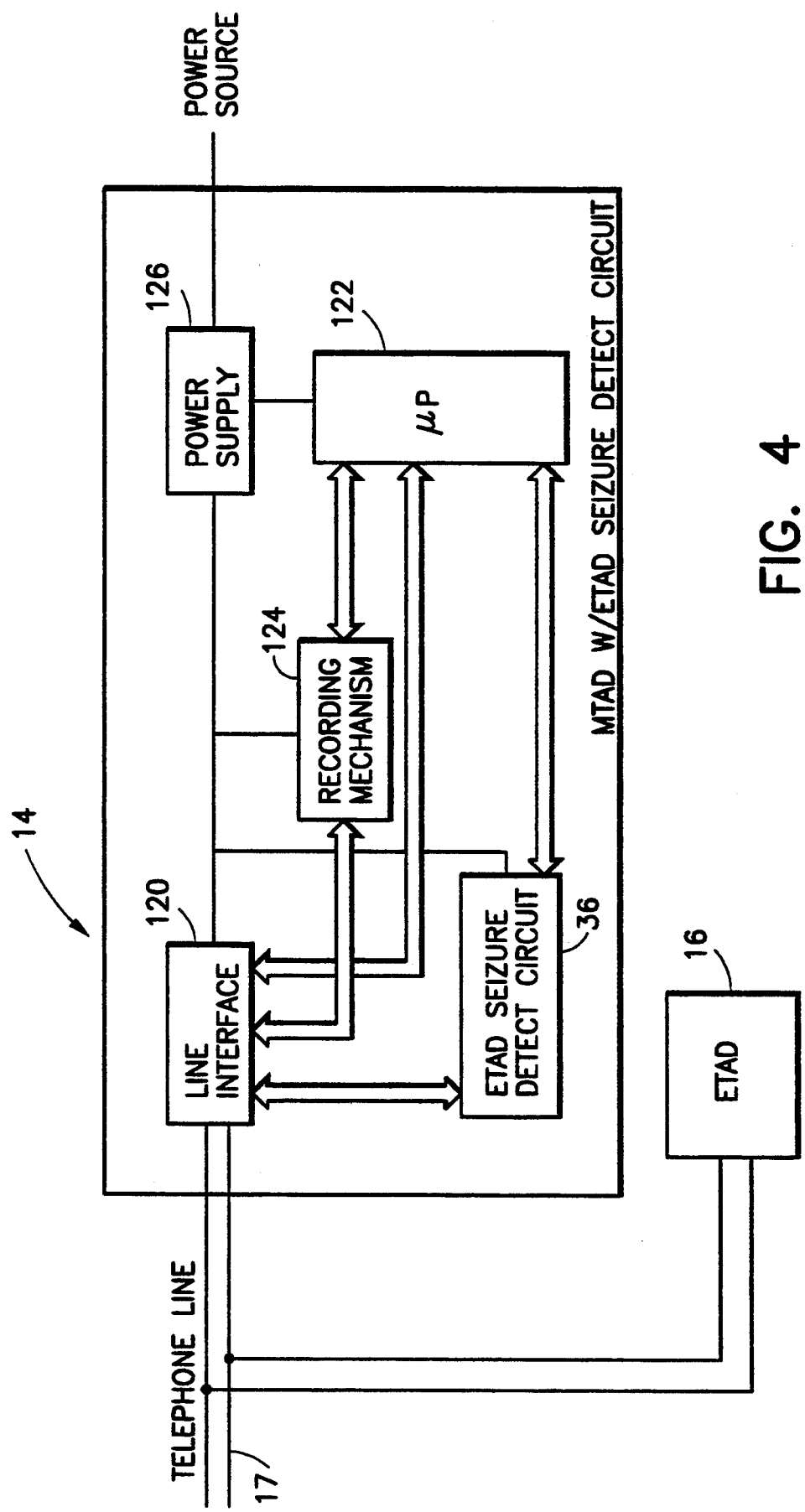
FIG. 4 is a schematic view of an MTAD incorporating the ETAD seizure detect circuit of the present invention.

As shown in FIG. 4, the MTAD 14 may incorporate the ETAD seizure detect circuitry 36. Several advantages are realized when the ETAD seizure disconnect circuit 36 is incorporated into the MTAD 14. The MTAD 14 can operate as a stand alone device without the operation of the ETAD seizure detect circuit 36 until such time as a compatible ETAD 16 is connected to the same telephone line 17 as the MTAD 14. Special wiring and packaging requirements necessary with a separate disconnect module 10 are no longer needed.

The MTAD 14 and all ETADs 16 are connected to the telephone line 17 in the usual manner. The ETAD seizure detect circuitry 36 now controls the MTAD's interaction with the telephone line 17 in conjunction with the line interface 120 and the microprocessor/controller ($\mu$P) 122.

The telephone line 17 is connected to the MTAD 14 via the line interface 120. The line interface 120 communicates with the ETAD seizure detect circuit 36, the recording mechanism 124, and the microprocessor 122. The ETAD seizure detect circuit 36 communicates with the line interface 120 and the microprocessor 122. The recording mechanism 124 communicates with the line interface 120 and the microprocessor 122. The microprocessor 122 communicates with the line interface 120, the recording mechanism 124, and the ETAD seizure detect circuit 36. A power supply 126 provides regulated power to the line interface 120, the ETAD seizure detect circuit 36, the recording mechanism 124, and the microprocessor 122.

As for the other, related circuitry set forth above, the ETAD seizure detect circuit 36 disconnects the MTAD 14 from the telephone line 17 when an ETAD 16 seizes the telephone line 17 to receive a call. Upon detection of an ETAD seizing the telephone line 17, the ETAD seizure detect circuit 36 could serve to physically disconnect the MTAD 14 from the telephone line 17 so that the ETAD 16 could function without interference from the MTAD 14. However, it is currently seen as preferable to have the detection of the line seizure by the ETAD 16 interpreted by the microprocessor 122.

As instructed by software implemented by the microprocessor 122, the microprocessor 122 can then control the response by the MTAD 14 to the ETAD's line seizure. The MTAD 14 may be disconnected from the telephone line 17 via the line interface 120 or all MTAD 14 responses to the incoming telephone call may be inhibited until the line-seizing ETAD 16 completes its cycle. Alternatively, once the microprocessor 122 has been signaled by the ETAD seizure detect circuit 36 that an ETAD 16 has seized the line 17, the microprocessor 122 can control the operation of the MTAD 14 to immediately halt the answering cycle and drop the connection with the telephone line 17. The MTAD 14 can then reset to answer the next incoming telephone call.

While the present invention has been described with regards to particular embodiments, it is recognized that additional variations of the present invention may be devised without departing from the inventive concept.

What is claimed is:

1. A system of multiple telephone answering devices connected to and sharing a single telephone line, comprising:
   a main telephone answering device (MTAD) connected to said single telephone line;
   at least one extension telephone answering device (ETAD) connected to said single telephone line, said at least one ETAD including an indicator to indicate when it has seized said single telephone line; and
   at least one disconnect module, said at least one disconnect module being connected to and between said single telephone line and said MTAD, said disconnect module comprising:
      a first sensor which detects an ETAD signal transmitted by said at least one ETAD when said at least one ETAD seizes a connection to said single telephone line, said first sensor generating a first sensor signal in response to receipt of said ETAD signal;
      a switch operative responsive to said first sensor signal for disconnecting said MTAD from said single telephone line;
      a second sensor for detecting an on or off hook status of said MTAD and for generating a second sensor signal in response to said MTAD going off hook; and
      a power supply for deriving original power from the telephone line when switched on, wherein said power supply is activated by at least said second sensor signal.

2. The system of multiple telephone answering devices as set forth in claim 1, wherein said first sensor detects an AC ETAD signal transmitted by said at least one ETAD.

3. The system of multiple telephone answering devices as set forth in claim 2, wherein said AC ETAD signal is an inaudible signal.

4. The system of multiple telephone answering devices as set forth in claim 1, wherein said first sensor detects a DC ETAD signal condition caused on said single telephone line by said at least one ETAD.

5. The system of multiple telephone answering devices as set forth in claim 4, wherein said DC ETAD signal has a DC voltage level that occurs when said at least one ETAD seizes a connection to the telephone line.

6. The system of multiple telephone answering devices as set forth in claim 1, wherein said power supply is maintained in an activated condition by said first sensor signal even after said second sensor signal is terminated.

7. In a system of multiple telephone answering devices connected to and sharing a single telephone line, a disconnect module comprising:

a regulated DC power supply connected to and deriving power from said single telephone line when switched on;

a switch coupled to said single telephone line for disconnecting a device coupled to said single telephone line through said disconnect module; and a line seizure detection circuit coupled to said single telephone line and to said switch, said detection circuit controlling said switch such that when an extension telephone answering device (ETAD) seizes said single telephone line, said detection circuit detects said seizure by said ETAD and signals said switch to disconnect said device which was coupled to said single telephone line;

and wherein said regulated DC power supply comprises:

a full-wave bridge rectifier connected to tip and ring lines of said single telephone line, and having a first negative output connected to common and a second positive output;

a pass element connected to said second positive output of said bridge rectifier and having an output, said pass element controlling a further transmission of power from said second rectifier output through said pass element; and a voltage regulator connected to said pass element and regulating power supplied through said pass element to said voltage regulator, said voltage regulator having at least one output supplying regulated DC voltage to said disconnect module.

8. The disconnect module of claim 7, wherein said switch comprises:

a relay; and a transistor connected to said relay such that when said transistor conducts current, said relay opens and disconnects said device coupled to said single telephone line from said single telephone line.

9. The disconnect module of claim 7, wherein said line seizure detection circuit includes means for detecting an AC signal transmitted by an ETAD.

10. The disconnect module of claim 9, wherein said AC signal is an inaudible signal.

11. The disconnect module of claim 9, wherein said line seizure detection circuit further comprises:

a first filtering capacitor connected to the tip line of said single telephone line;

a second filtering capacitor connected to the ring line of said single telephone line;

a differential amplifier connected to both said first and said second filtering capacitors;

a high pass filter connected to said differential amplifier;

a peak detector connected to said high pass filter; and a comparator connected to said peak detector and to said voltage regulator; whereby when an ETAD transmits a signal over said single telephone line, alternating current signals are transmitted across said first and second filtering capacitors and into said differential amplifier, said differential amplifier receives said alternating current signals and preferentially amplifies signals of higher frequencies and attenuates signals of lower frequencies and transmits the preferentially amplified higher frequency signals to said high pass filter;

said high pass filter receives said preferentially amplified higher frequency signals from said differential amplifier, said high pass filter at least greatly attenuating lower frequency signals from said signals transmitted by said differential amplifier and transmitting higher frequency signals to said peak detector;

said peak detector receives said lower-frequency-attenuated signals from said high pass filter and in proportion to a signal at its input, said peak detector transmits a signal at its output to said comparator; and said comparator receives said signal from said peak detector output and compares it with a reference voltage signal derived from said voltage regulator and if said peak detector output signal is sufficiently greater than said reference voltage signal, said comparator transmits a signal indicating presence of a signal upon said single telephone line.

12. The disconnect module of claim 7, wherein said line seizure detection circuit comprises means for detecting a change in a DC voltage that occurs when said ETAD seizes a connection to said single telephone line.

13. The disconnect module of claim 12, wherein said line seizure detection circuit further comprises:

a self-biasing comparator connected to said regulated DC power supply; and a one-shot multivibrator connected to said self-biasing comparator; whereby when said self-biasing comparator detects a change in DC line voltage occurring when an ETAD seizes a connection to said single telephone line, said self-biasing comparator triggers said one-shot multivibrator to disconnect said device coupled to said single telephone line through said disconnect module for a predetermined period of time.

14. The disconnect module of claim 7, further comprising:

a line current sense circuit coupled to said single telephone line and to said switch, said sense circuit detecting a presence of current flowing through said sense circuit; and an OR gate coupled to said pass element, to said line current sense circuit, and to said line seizure detection circuit, said OR gate controlling transmission of unregulated power through said pass element; whereby said OR gate allows said pass element to transmit power when either or both said line current sense circuit detects current flowing therethrough and said detection circuit detects an ETAD seizure of a connection to said single telephone line.

* * * * *